__United States Patent Office__

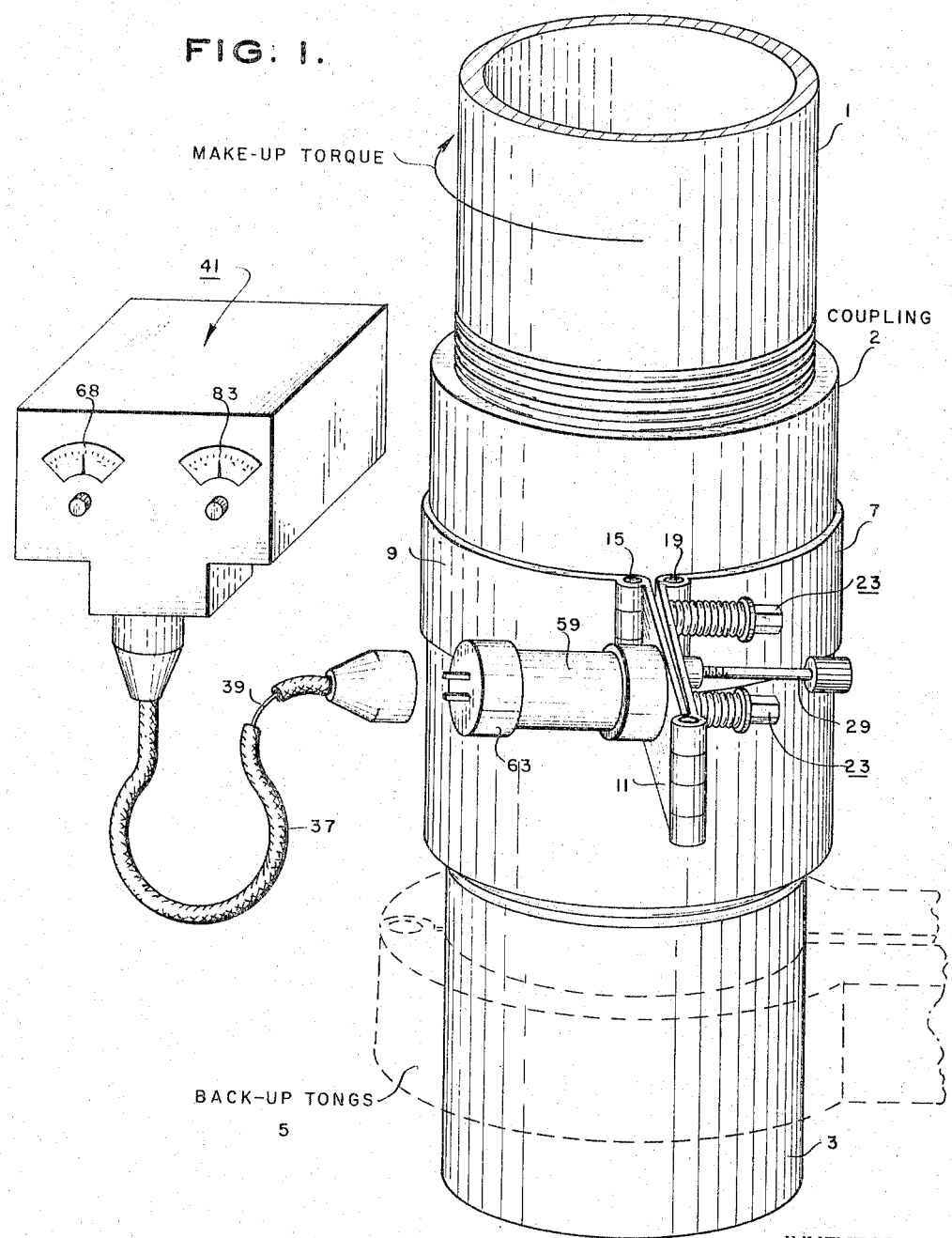

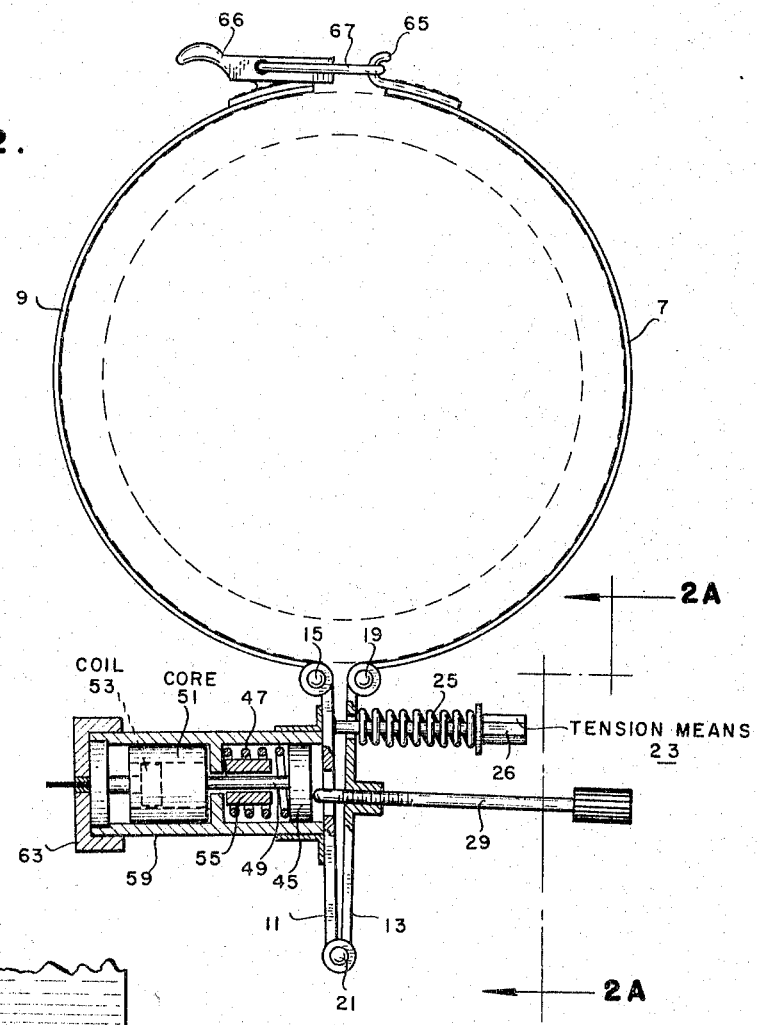
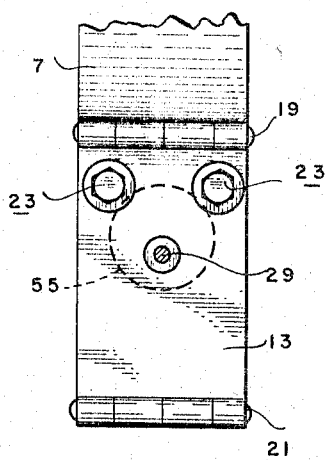

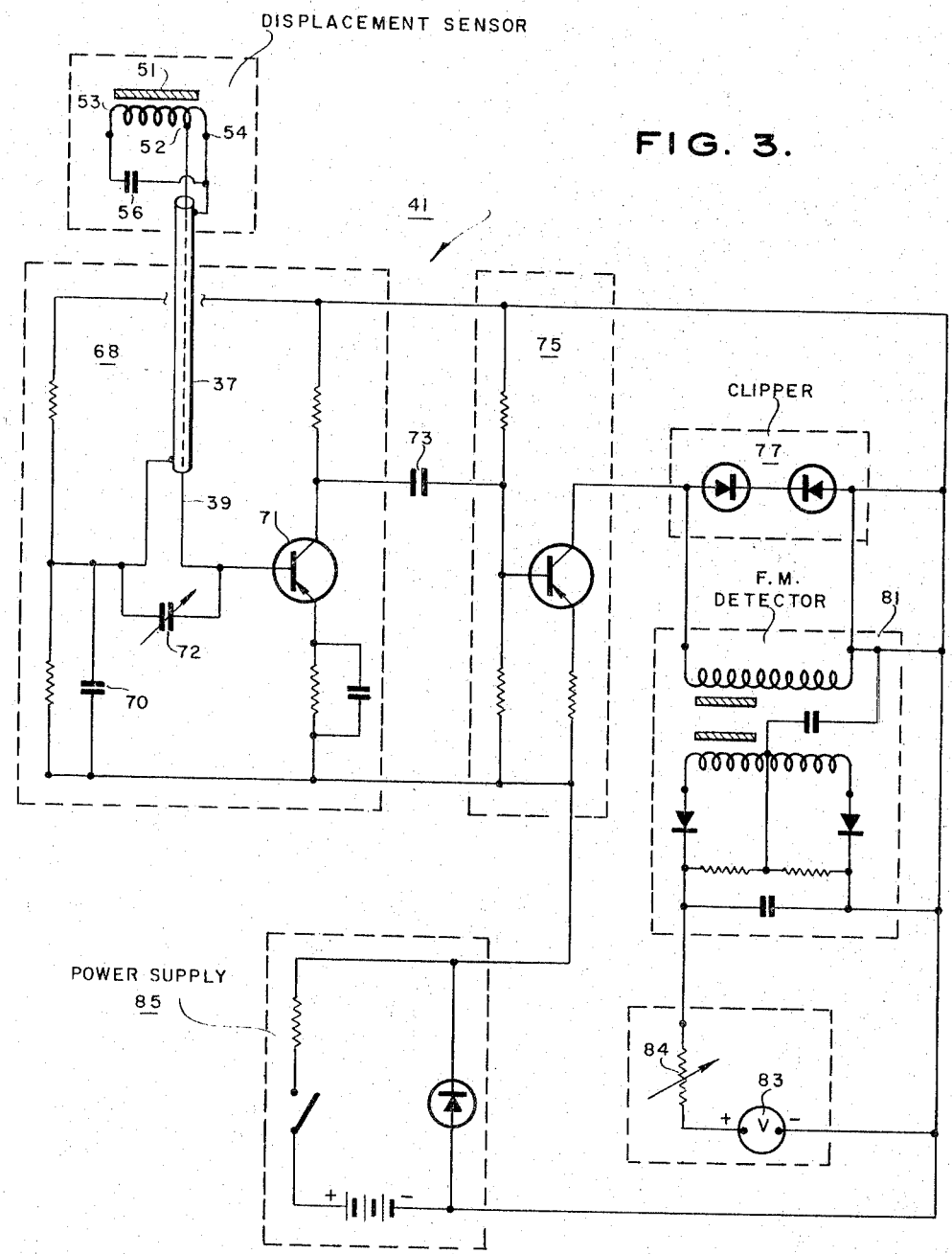

3,314,156
Patented Apr. 18, 1967

3,314,156
APPARATUS FOR USE IN MAKING
UP PIPE STRINGS
Glenn G. Van Burkleo, Houston, Tex., assignor, by mesne assignments, to Esso Production Research Company, Houston, Tex., a corporation of Delaware
Filed July 8, 1964, Ser. No. 381,043
4 Claims. (Cl. 33—179)

This invention relates to apparatus for controlling the operation of power tongs such as are used in the assembly of pipe strings in a well, and more particularly to apparatus for controlling the tightness of coupling of well pipe strings.

After a borehole has been drilled in the earth for the purpose of penetrating hydrocarbon-containing earth formations, pipe strings are run into the borehole to facilitate the flow of connate earth fluids to the earth's surface. The pipe strings are assembled at the well site from sections each having a pin at one end and a box member at the other end or, alternatively, pins at each end and a double box between. As the pipe sections are connected together, they are run into the well bore.

The assembly of the pipe string section is facilitated by the use of a power tong which comprises a rotary jaw member for gripping the well pipe, and a motor for rotating the jaw member until the pipe string sections have been tightened to a desired degree. The joint must be tight enough to prevent leakage and to develop high joint strength. However, the joint must not be so tight as to damage the threads of either the box member or the pin of the connected pipe sections.

In the past a number of techniques have been used to determine the amount of torque required to connect the pipe strings together with the desired degree of tightness. For example, various methods of applied torque measurements have been used, such as adjusting the air supply maximum output pressure to the pneumatically driven tong motors to provide the required maximum torque as dictated by joint properties and tong power characteristics. Proper torque presumably develops when the tong motor stalls. Other techniques have been used to determine proper joint make-up, such as to measure the number of turns past a varying and unpredictable pin-box member engagement referred to as "hand tight." The accuracy of all of the methods used heretofore are influenced by human factors such as operator skill, attention to duty, and fatigue. Furthermore, where the "hand tight" technique is used, torque may develop early as the result of galled threads in the pin or box member, or the pin or box member may be dirty so that damage to the threads will result should an attempt be made to turn the pin or box members through a predetermined additional number of turns. Also, should a new pin be used in a new box so that the threads' surfaces are not properly mated, "hand-tight" torque may develop, but there will be no appreciable amount of torque increase thereafter until a very large number of turns in the coupling has been effected. In either case, the result will be a loose coupling that will leak badly when subjected to internal high pressure. Recent studies have indicated that approximately 85% of the tubing strings in United States oil and gas wells have at least one leaking connection. Considering the number of connections in a pipe string, this may not appear to be too bad until it is realized that one leaking connection in the tubing string of a high pressure gas well can cause a blowout that may result in loss of well.

In accordance with the teachings of the present invention, apparatus for indicating proper make-up of a pair of annular members to be screw-threadedly connected together comprises means for connection to the outer of the members for varying a characteristic of a signal generating means in accordance with variations in the circumference of the outer of the annular members. Coupled to the signal generating means is means for detecting variations in the output signal of the signal generating means, and for producing a predetermined output indication when the characteristic is of a given value indicative of proper make-up of the joint.

More particularly, the invention comprises a variable reactance means and means connected thereto for connection to the outer of the annular members for varying the reactance of the variable reactance means in accordance with variations in the circumference of the outer of the annular members. The signal generating means is connected to the variable reactance means so that variations in the reactance thereof will vary the output signal of the variable reactance means. Circuit means is coupled to the signal generating means for producing an output indication variable in accordance with variations in frequency of the signal generating means. The signal generating means and the circuit means taken together may be considered as circuit means for producing an output signal having a characteristic variable in accordance with variations in reactance of the variable reactance means.

Objects and features of the invention not apparent from the above discussion will become evident upon consideration of the following description of the invention taken in connection with the accompanying drawing, wherein:

FIG. 1 is an isometric view of one embodiment of the invention shown coupled to an annular coupling member between screw-threaded pipe strings to be connected together;

FIG. 2 is a view partially in cross section of apparatus for measuring variations in the outer circumference of the coupling member of FIG. 1, which apparatus is illustrated in FIG. 1;

FIG. 2A is a fractional side view from the right of a portion of the apparatus of FIG. 2; and FIG. 3 is an electrical schematic diagram of apparatus in accordance with the invention, including a portion of the apparatus of FIG. 2.

With reference to FIG. 1, there is shown a pair of annular pipe strings 1 and 3 to be screw-threadedly connected together by a sleeve coupling 2. Back-up tongs 5 are shown connected to pipe string 3. The back-up tongs may be considered to reaction member permitting the coupling 2 to be tightened on pipe string 3 and pipe string 1 to be tightened into coupling 2 by exertion of torque on pipe string 1 by additional power tongs (not shown).

With reference to FIGS. 1 and 2 taken together, there is shown apparatus for measuring variations in circumference of the coupling 2 as the pipe string 1 is threaded into coupling 2 and as the coupling and pipe strings are tightened by torque exerted on pipe string 1. This apparatus comprises a pair of substantially semicircular band members 7 and 9 which, taken together, can be considered to be an annular band having a gap therein for encircling coupling 2. One pair of matching ends of the band members is connected by a buckle assembly including a hook 65 welded or otherwise affixed to band member 7, and a pivot latch 69 affixed to band member 9 having a catch 67 for engaging hook 65. The other matching ends of band members 7, 9 are connected together by hinge members 11 and 13. The hinge members are pivotally connected together by pivot pin 21, and are pivotally affixed to band members 7, 9 by pivot pins 15, 19. The distance between the matching ends of the band members 7, 9 to which the hinge is affixed is measured by varying the reactance of coil 53 which is housed in a case 59 affixed to hinge member 11. An end member 63 closes the open end of the case 59. Terminals connected to the coil 53 are insulatively affixed to the end member 63. The reactance of coil 53 is varied by means of a cup-type ferrite core 51 which slides over the coil 53. The distance that the ferrite core extends over the coil 53 (or the distance that the coil 53 extends into core 51) determines the reactance of the coil. The position of the core 51 relative to the coil 53 is adjusted by means of apparatus including a piston 45, a spring 47 for urging the piston to the right as viewed, and a connecting rod 49 for connecting the core 51 to piston 45. A spring guide and mechanical stop member 55 within the spring 47 serves to prevent the spring from buckling and from preventing the core 51 from extending too great a distance over coil 53. The initial position of the piston 45 is determined by an adjustable screw 29 which extends through hinge members 11 and 13 and screw-threadedly engages hinge member 13. The hinge members are urged together (thus urging together the matching ends of band members 7 and 9 connected thereto) by means of a pair of tension units 23, each comprising a spring 25 encircling a bolt 26 which extends through hinge member 13 so as to be affixed to hinge member 11. The springs are in compression between hinge member 13 and the respective bolt heads. Adjusting screw 29 engages piston 45 to determine the initial position of ferrite core 51 relative to coil 53.

With reference now to FIG. 3, coil 53 is seen to be a tapped coil having a capacitor 56 (not shown in FIG. 2) connected across the end terminals thereof. The tap 52 of coil 53 is connected to a sheathed conductor 39, the sheath of which is connected to end terminal 54 of the coil. The sheathed conductor is connected to input terminals of apparatus 41 for producing an output signal having a characteristic that is variable in accordance with variations in reactance of the coil 53. This apparatus comprises a transistorized radio frequency oscillator 68 having as its control valve a transistor 71, the base member of which is connected to the tap 52 through conductor 39. The sheath 37 is connected to a parallel resistance capacitor circuit 70 so that the reactance of the coil 53 determines the frequency of operation of oscillator 68. A capacitor 72 connected between conductor 39 and sheath 37 provides a fine tuning or zero adjustment for the oscillator 68. Oscillator 68 is of a type well known to the art and is described in Transistors Handbook by William D. Bevitt.

The output of the oscillator 68 is coupled to a transistor amplifier 75 by means of a coupling capacitor 73. The output of the amplifier 75 is coupled to a limiter or clipper 77 to remove amplitude variations in the output signal thereof. The output of the clipper 77 is coupled to a Foster-Sealy discriminator of frequency modulation detector 81, the function of which is to produce an output signal that is variable in amplitude in accordance with variations in the frequency of the radio frequency signal fed thereto. The output signal of the Foster-Sealy discriminator 81 is measured by a voltmeter 83 coupled across the output of discriminator 81 by a resistor 84. A voltage regulated power supply 85 provides power for the circuit described above.

The operation of the apparatus described above is as follows. Band members 7 and 9 are clasped around coupling 2 and are buckled together. The position of ferrite core 51 relative to coil 53 is adjusted by means of adjusting screw 29 until voltmeter 83 produces a desired output indication for Foster-Sealy discriminator 81. As pipe string 1 is tightened on coupling 2, the circumference of coupling 2 will tend to increase. The matching ends of band members 7 and 9, to which the hinge members 11 and 13 are affixed, will tend to move apart. Piston 45 and core 51 will move to the right as viewed in FIG. 2 so that the reactance of coil 53 will decrease. The frequency of oscillator 68 thus will increase to change the output signal produced by Foster-Sealy discriminator 81 and the magnitude of the output indication of meter 83. When the output of meter 83 has reached a desired value indicative of desired make-up, power on the make-up tongs will be released and the tongs disconnected from the pipe strings. The apparatus described can then be released from the coupling by releasing the buckle assembly.

Manifestly, the ferrite core 51 may be of the type that is insertable into the coil 53 rather than surrounding the coil as shown. Furthermore, amplifier 75 may be connected to the discriminator 81 by means of a radio frequency communications link such as would be provided by connecting a transmitting antenna to amplifier 75 and a receiving antenna and radio frequency receiver to Foster-Sealy limiter 77.

Other modifications will be apparent to those skilled in the art which do not depart from the broadest aspects of the invention.

What is claimed is:
1. Apparatus for indicating proper make-up of a screw-threadedly engaged joint, comprising:
   a bipartite band including first and second band members, for encircling one of the members of said joint;
   hinge means connected to first matching ends of said band members;
   means connecting together the other matching ends of said band members;
   means connected to said hinge means for urging together said first matching ends of said band members;
   variable reactance means connected to said hinge means;
   magnetic means connected to said hinge means and extending into said reactance means for varying the reactance of said reactance means in accordance with the distance said magnetic means extends into said reactance means;
   manually adjustable means for adjusting the initial distance said magnetic means extends into said reactance means;
   said reactance and said magnetic means being connected to said hinge means so that the distance said magnetic means extends into said reactance means varies in accordance with the distance between said first matching ends of said band members;
   signal generating means connected to said reactance means for producing a signal variable in frequency in accordance with the reactance of said reactance means; and
   circuit means coupled to said signal generating means for producing an output indication variable in accordance with variations in frequency of said signal generating means.

2. Apparatus for indicating proper make-up of a screw-threadedly engaged joint, comprising:
   a bipartite band including first and second band members, for encircling one of the members of said joint;
   hinge means connected to first matching ends of said band members;
   means connecting together the other matching ends of said band members;
   means connected to said hinge means for urging together said first matching ends of said band members;
   variable reactance means connected to said hinge means;
   magnetic means connected to said hinge means and extending into said reactance means for varying the reactance of said reactance means in accordance with the distance said magnetic means extends into said reactance means;
   manually adjustable means for adjusting the initial distance said magnetic means extends into said reactance means;
   said reactance means and said magnetic means being connected to said hinge means so that the distance said magnetic means extends into said reactance means varies in accordance with the distance between said first matching ends of said band members;

signal generating means connected to said reactance means for producing a signal variable in frequency in accordance with the reactance of said reactance means;

frequency modulation detector means coupled to said signal generating means for producing an output signal variable in magnitude in accordance with variations from a reference frequency in the frequency produced by said signal generating means; and indicator means coupled to said frequency modulation detector means for producing an output indication variable in accordance with variations in magnitude of said frequency modulation detector means output signal.

3. Apparatus for indicating proper make-up of a screw-threadedly engaged joint, comprising:

a bipartite band including first and second band members, for encircling one of the members of said joint;

hinge means connected to first matching ends of said band members;

means connecting together the other matching ends of said band members;

means connected to said hinge means for urging together said first matching ends of said band members;

variable reactance means connected to said hinge means;

magnetic means connected to said hinge means and extending into said reactance means for varying the reactance of said reactance means in accordance with the distance said magnetic means extends into said reactance means;

manually adjustable means for adjusting the initial distance said magnetic means extends into said reactance means;

said reactance means and said magnetic means being connected to said hinge means so that the distance said magnetic means extends into said reactance means varies in accordance with the distance between said first matching ends of said band members; and circuit means coupled to said reactance means for producing an output signal having a characteristic variable in accordance with variations in reactance of said variable reactance means.

4. Apparatus for indicating proper make-up of a screw-threadedly engaged joint, comprising:

a bipartite band including first and second band members, for encircling one of the members of said joint;

hinge means connected to first matching ends of said band members;

means connecting together the other matching ends of said band members;

means connected to said hinge means for urging together said first matching ends of said band members;

variable reactance means connected to said hinge means;

means connected to said hinge means for varying the reactance of said variable reactance means in accordance with the distance between said first matching ends of said band members; and circuit means coupled to said reactance means for producing an output signal having a characteristic variable in accordance with variations in reactance of said variable reactance means.

References Cited by the Examiner

UNITED STATES PATENTS

| | | | |
|---|---|---|---|
| 200,364 | 2/1878 | Van Horne | 33—179 |
| 783,562 | 2/1905 | Zimmerman | 33—179 |
| 1,889,089 | 11/1932 | De Giers | 33—179 X |
| 2,387,496 | 10/1945 | Cornelius | 33—17 X |
| 2,509,986 | 5/1950 | Neff | 33—172 |
| 2,637,907 | 5/1953 | Aubrey et al. | 33—179 |

LEONARD FORMAN, *Primary Examiner.*

S. S. MATTHEWS, *Assistant Examiner.*